US010007941B1

(12) United States Patent
Liu et al.

(10) Patent No.: US 10,007,941 B1
(45) Date of Patent: Jun. 26, 2018

(54) LOCATION-BASED OBFUSCATION OF USER INFORMATION

(71) Applicant: Capital One Services, LLC, McLean, VA (US)

(72) Inventors: Zhe Liu, McLean, VA (US); Jeremy Phillips, Brooklyn, NY (US); Hannah Volfson, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days. days.

(21) Appl. No.: 15/806,055

(22) Filed: Nov. 7, 2017

(51) Int. Cl.
*G06Q 30/06* (2012.01)
*G06Q 10/08* (2012.01)

(52) U.S. Cl.
CPC ..... *G06Q 30/0615* (2013.01); *G06Q 10/0833* (2013.01); *G06Q 30/0639* (2013.01); *G06Q 30/0641* (2013.01)

(58) Field of Classification Search
CPC ............................ G06Q 30/06; G06Q 30/0261
USPC ............................................. 705/26.1, 14.58
See application file for complete search history.

(56) References Cited

U.S. PATENT DOCUMENTS

| 7,249,344 | B1 | 7/2007 | Zeanah et al. |
| 7,502,752 | B1 | 3/2009 | Lemons et al. |
| 2014/0180914 | A1 | 6/2014 | Abhyanker |
| 2015/0169891 | A1* | 6/2015 | Hook ................. G06Q 30/0257 726/29 |
| 2015/0350890 | A1* | 12/2015 | Arunkumar ........... H04W 12/02 455/411 |
| 2016/0189159 | A1* | 6/2016 | Luk .................... G06Q 20/3224 705/39 |
| 2017/0004445 | A1* | 1/2017 | Lazier ................ G06Q 10/0835 |
| 2017/0213250 | A1* | 7/2017 | Ortega ............... G06Q 30/0257 |

OTHER PUBLICATIONS

Wikipedia, "Location obfuscation", https://en.wikipedia.org/wiki/Location_obfuscation, Sep. 25, 2017, 2 pages.
Ha et al., "I Just Used Nimbl to Get 40 Bucks Delivered to the AOL Office", https://techcrunch.com/2014/10/03/nimbl-is-uber-for-cash/, Oct. 3, 2014, 8 pages.

* cited by examiner

*Primary Examiner* — Mila Airapetian
(74) *Attorney, Agent, or Firm* — Harrity & Harrity, LLP

(57) ABSTRACT

A device is provided to receive, from a first device, a request for a product or service, determine a first geographic location of the first device, and identify a second device that is located in a geographic region associated with the first geographic location. The second device may be associated with a user that is capable of providing the product or service. The device may provide, to the first device, information regarding a second geographic location of the second device. The information may specify an obfuscated second geographic location without revealing the second geographic location. The device may also receive, from the first device, an instruction to provide the request to the second device, provide the request to the second device, receive an acceptance of the request from the second device, and provide, to the second device, data indicating the first geographic location of the first device.

20 Claims, 7 Drawing Sheets

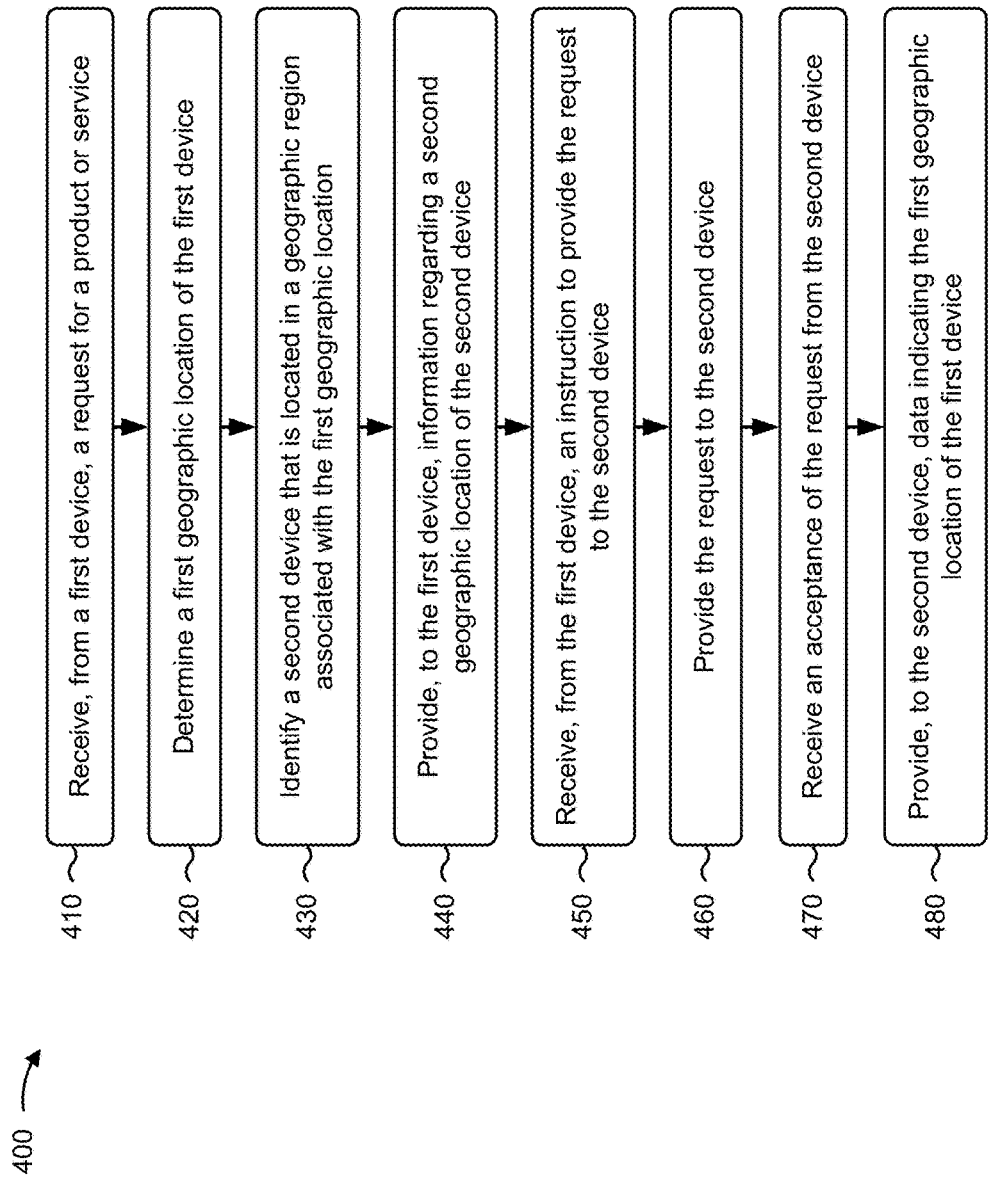

LOCATION-BASED OBFUSCATION OF USER INFORMATION

BACKGROUND

People often provide other people, or computing devices, with information regarding their location for a variety of reasons, e.g., for delivery of goods and services, for transportation services, or the like. A computing device may often include one or more components capable of identifying a location of the computing device (e.g., global positioning satellite component, Wi-Fi component, or the like) to determine a geographic location of the computing device, which can be provided to other users and/or devices (e.g., for delivery of goods and services).

SUMMARY

According to some possible implementations, a device may include one or more processors to: receive, from a first device, a request for a product or service; determine a first geographic location of the first device; identify, based on the request, a plurality of second devices that are located in a geographic region associated with the first geographic location, the plurality of second devices being associated with respective users that are capable of providing the product or service; provide, to the first device, information regarding second geographic locations of the plurality of second devices, the information specifying an obfuscated second geographic location of at least one of the plurality of second devices and specifying an actual second geographic location of at least one other one of the plurality of second devices; receive, from the first device, an instruction to provide the request to a subset of the plurality of second devices; provide, based on the instruction, the request to the subset of the plurality of second devices; receive an acceptance of the request from a second device included in the subset of the plurality of second devices; and provide, to the second device and based on receiving the acceptance, data indicating the first geographic location of the first device.

According to some possible implementations, a non-transitory computer-readable medium may store instructions, the instructions including one or more instructions that, when executed by one or more processors, cause the one or more processors to: receive, from a first device, a request for a product or service; determine a first geographic location of the first device; identify, based on the request, a second device that is located in a geographic region associated with the first geographic location, the second device being associated with a user that is capable of providing the product or service; provide, to the first device, information regarding a second geographic location of the second device, the information specifying an obfuscated second geographic location of the second device without revealing the second geographic location of the second device; receive, from the first device, a first instruction to provide the request to the second device; provide, based on the first instruction, the request to the second device; receive an acceptance of the request from the second device; and provide, to the second device, data indicating the first geographic location of the first device.

According to some possible implementations, a method may include: receiving, by a server device and from a first device, a request for a product or service; determining, by the server device, a first geographic location of the first device; identifying, by the server device and based on the request, a second device that is located in a geographic region associated with the first geographic location, the second device being associated with a user that is capable of providing the product or service; providing, by the server device and to the first device, information regarding the second device; receiving, by the server device and from the first device, an instruction to provide the request to the second device; providing, by the server device and based on the instruction, the request to the second device; receiving, by the server device, an acceptance of the request from the second device; and providing, by the server device and to the second device, data indicating the first geographic location of the first device; and providing, by the server device and to the first device, information specifying an obfuscated second geographic location of the second device.

BRIEF DESCRIPTION OF THE DRAWINGS

FIG. 4 is a flow chart of an example process for performing location-based obfuscation of user information.

DETAILED DESCRIPTION

Figure 1A:
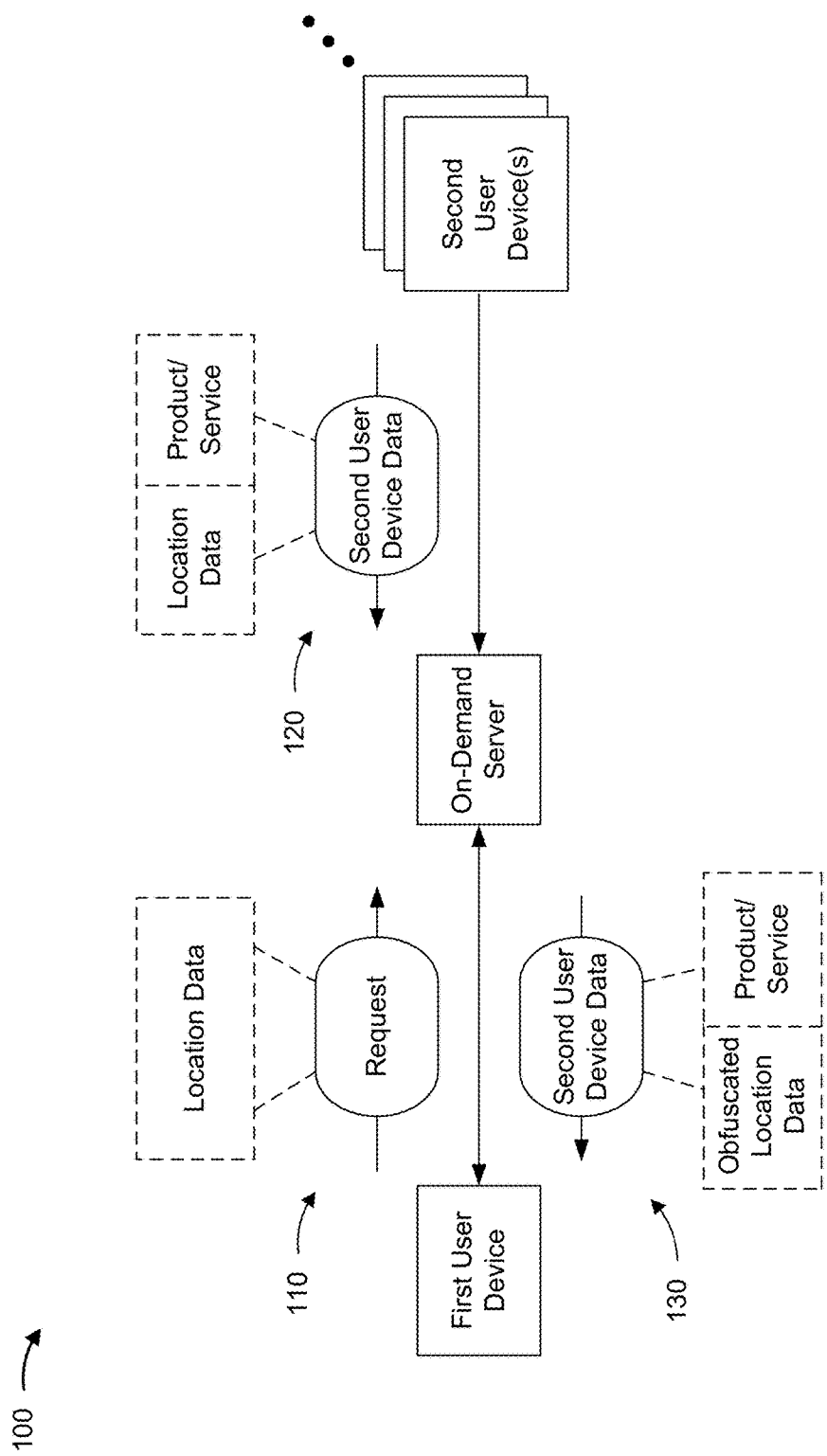
FIGS. 1A and 1B are diagrams of an overview of an example implementation described herein.

The following detailed description of example implementations refers to the accompanying drawings. The same reference numbers in different drawings may identify the same or similar elements.

Users that wish to physically meet one another, e.g., for the purpose of providing and/or receiving a product and/or service, may use a user device to facilitate meeting one another. For example, a first user of a first user device may provide the first user's location to a second user of a second user device, and the second user may provide the second user's location to the first user, e.g., to facilitate the ability for the users to meet up and exchange goods and/or services. While providing one another with location data (such as GPS location information) may facilitate a meeting between users, in some situations a user may not want their location—or other potentially personal details—to be revealed to another user, e.g., when user privacy and/or safety is a concern.

Some implementations, described herein, provide an on-demand server that is capable of facilitating transactions between users in a manner designed to ensure privacy and/or safety for the users. For example, an on-demand server may receive a request for a product or service in a first geographic location, identify—in a nearby geographic region—available providers of the product or service, and provide obfuscated location data of the providers to the requestor (e.g., in a manner designed to obfuscate the location of the available providers). In some implementations, the on-demand server may receive—from a requesting user device—a selection of a particular provider to provide the product or service and send the particular provider information identifying a geographic location of the requestor (e.g., to enable the provider to take the product to or provide the service at the location of the requestor). While the particular provider is in transit to the requestor, the on-demand server may obfuscate the actual location of the provider and provide the obfuscated location information to the requestor, enabling the requestor to have a general idea of where the provider is without giving away the exact location of the provider.

The ability to obfuscate location data, and potentially other information, of one or more users associated with a transaction may improve privacy and/or security for users participating in such transactions. Using a server device to facilitate transactions where individuals meet may also conserve resources (e.g., processing resources, data storage resources, network bandwidth resources, and time) for user devices that might otherwise have been responsible for using user device resources to identify potential providers of goods and services and to provide obfuscated and/or un-obfuscated location data. In some implementations, the server may use customizable privacy and/or location settings for users involved in a transaction, obviating the need for users to provide transaction details and preferences with every transaction, which may further conserve resources used by user devices during a transaction.

Figure 1B:
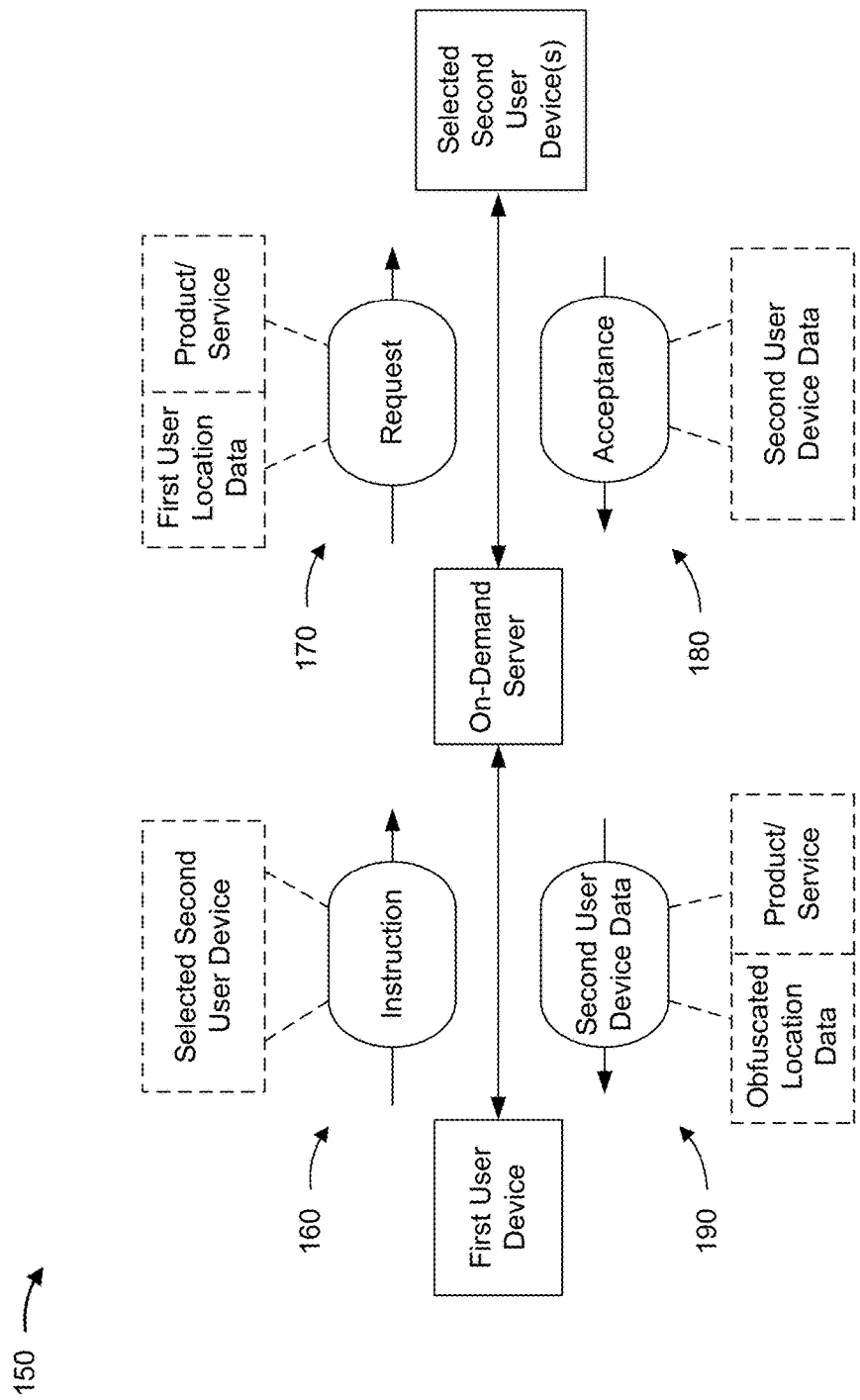

FIGS. 1A and 1B are diagrams of an overview of example implementations 100 and 150 described herein. As shown in FIGS. 1A and 1B, example implementations 100 and 150 include a first user device (e.g., a personal computer, smart phone, or the like) for requesting products or services, second user devices (e.g., personal computers, smart phones, or the like) associated with users that may be capable of providing the requested products or services, and an on-demand server that may facilitate a transaction between the first user device and one of the second user devices.

As shown in FIG. 1A, and by reference number 110, the first user device sends a request to the on-demand server. The request may be for a product or service, and location data may also be associated with the request (e.g., sent with or separately from the request). The location data indicates the location of the first user device (e.g., global positioning satellite (GPS) based location information or another kind of location data).

As further shown in FIG. 1A, and by reference number 120, the on-demand server receives second user device data from the second user devices. The second user devices may be, for example, user devices associated with users who are capable of providing various goods and/or services. The second user device data may identify the goods or services each user of a second user device is capable of and/or willing to provide to requesting users. The second user device data is associated with location data that indicates the locations of the second user devices (e.g., GPS based location information or another kind of location data).

As further shown in FIG. 1A, and by reference number 130, the on-demand server provides second user device data to the first user device. The on-demand server can determine which second user device data to provide based on the location data provided by the first user device and the second user devices. For example, the on-demand server may identify second user devices that are in a geographic region near or including the location associated with the first user device, and the on-demand server may provide second user device data for those second user devices. In some implementations, the on-demand server may also identify second user devices that are capable of providing a particular product or service, such as a good or service requested by the first user device. In this situation, on-demand server may provide second user device data for the second user devices that are both near the first user device and that are capable of providing the requested product or service.

In some implementations, the on-demand server obfuscates second user device data before providing the second user device data to the first user device. For example, and as shown in FIG. 1A, the on-demand server has obfuscated the location data of the second user devices. The location data may be obfuscated, for example, in a manner designed to provide a user of the first user device with an indication of a general area in which the second user devices are located without providing an actual location (e.g., GPS coordinates, or the like) for the second user devices, e.g., in a manner designed to protect the privacy and ensure safety of users of the second user devices. In some implementations, providing the first user device with second user device data of multiple nearby second user devices that are capable of providing a particular product or service may enable the user of the first user device to select a user associated with one of the second user devices to provide the particular product or service.

The example implementation 150 shown in FIG. 1B depicts another aspect of location-based obfuscation of user information, e.g., depicting a possible situation that occurs after implementation 100, where the first user device has been provided with data identifying second user devices capable of provided the requested product or service. As shown in the example implementation 150 of FIG. 1B, and by reference number 160, the first user device may provide the on-demand server with instructions that include selecting a particular user associated with a particular second user device to provide the requested product or service.

As further shown in FIG. 1B, and by reference number 170, the on-demand server provides a request to the selected second user device. The request includes data identifying the location of the first user device as well as the requested product or service. Providing the selected second user device with the request enables the second user device that was selected by the user to determine whether to accept the request.

As further shown in FIG. 1B, and by reference number 180, the on-demand server receives, from the selected second user device, data indicating acceptance of the request. The acceptance may indicate second user device data, such as the location of the selected second user device and/or the product or service being provided. The acceptance provides on-demand server with an indication that the particular user of the selected second user device will be going to the location associated with the first user device to provide the requested product or service.

As further shown in FIG. 1B, and by reference number 190, on-demand server provides second user device data to the first user device. The second user device data can include, for example, data indicating the acceptance of the request by the selected second user device, obfuscated location data, or the like. For example, the on-demand server can obfuscate the location of the selected second user device and provide the first user device with data indicating the obfuscated location, rather than the exact location of the selected second user device. The obfuscated location of the selected second user device may include, for example, an estimated time of arrival (ETA) and/or an estimated delivery time for when the selected second user device expects to reach the location of the first user device, a map application indicator indicating a coarse estimate of the position of the selected second user device, or the like. Providing the obfuscated location of the selected second user device may provide the user of the first user device with information of interest concerning delivery of the requested product or service (e.g., an estimate regarding when the user of the selected second user device should arrive) in a manner designed to protect the privacy of, and ensure the safety of, the user of the selected second device.

As indicated above, FIGS. 1A and 1B are provided merely as examples. Other examples are possible and may differ from what was described with regard to FIGS. 1A and 1B.

Figure 2:
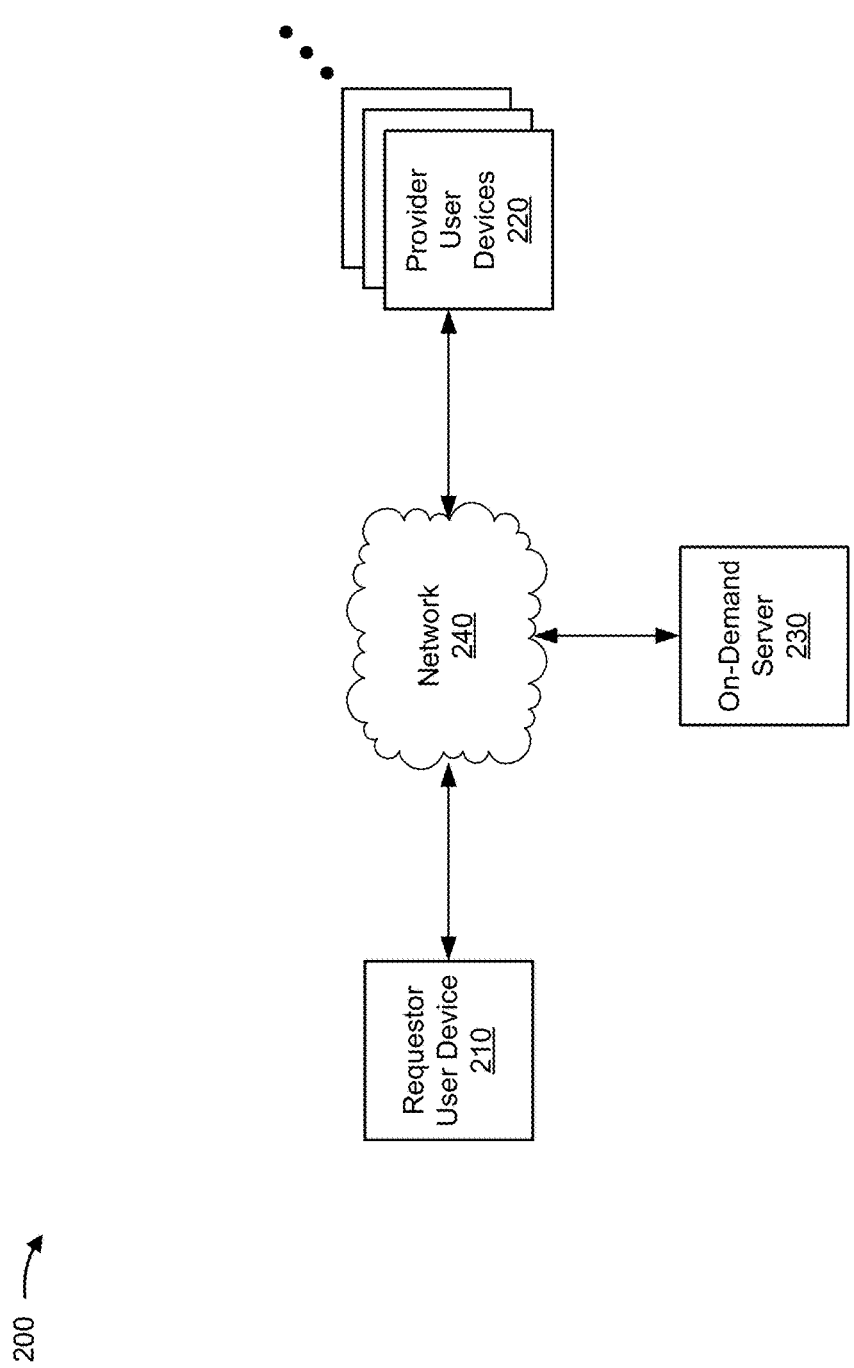
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a requestor user device 210, multiple provider user devices 220, an on-demand server 230, and a network 240. Devices of environment 200 may interconnect via wired connections, wireless connections, or a combination of wired and wireless connections.

Requestor user device 210 includes one or more devices capable of receiving, generating, storing, processing, and/or providing information associated with location-based transactions. For example, requestor user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, requestor user device 210 may include hardware or a combination of hardware and software for determining a geographic location associated with the requestor user device 210 (e.g., GPS sensor, Wi-Fi radio, Bluetooth radio, mapping application, or the like). In some implementations, requestor user device 210 may include one or more applications to facilitate location-based transactions, such as a peer-to-peer transaction application to facilitate transactions involving products and/or services that can be provided by nearby users, e.g., users of provider user devices 220.

Provider user device 220 includes one or more devices capable of receiving, generating, storing, processing, and/or providing information associated with location-based transactions. In some implementations, provider user device 220 may include a device that is the same type as or a similar type to requestor user device 210. For example, provider user device 220 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, provider user device 220 may include hardware or a combination of hardware and software for determining a geographic location associated with the provider user device 220 (e.g., GPS sensor, Wi-Fi radio, Bluetooth radio, mapping application, or the like). In some implementations, provider user device 220 may include one or more applications to facilitate location-based transactions, such as a peer-to-peer transaction application to facilitate transactions involving products and/or services that can be requested by nearby users, e.g., a user of requestor user device 210.

On-demand server 230 includes one or more devices capable of receiving, generating, storing, processing, and/or providing information associated with location-based transactions. On-demand server 230 may include a computing device, such as a server computer, personal computer, mobile phone, laptop computer, tablet computer, or a similar type of device. In some implementations, on-demand server 230 may be implemented by a group of server devices of a cloud computing environment or a data center. For example, some or all of the functions of on-demand server 230 may be performed by one or more virtual machines implemented on one or more server devices in the cloud computing environment or the data center.

In some implementations, on-demand server 230 includes hardware and/or a combination of hardware and software to enable communications with other devices, such as requestor user device 210 and provider user devices 220. In addition, on-demand server 230 may be capable of obfuscating location data, e.g., enabled by hardware and/or a combination of hardware and software, and/or enabled by communicating with a third party device capable of performing location obfuscation. On-demand server 230 may, in some implementations, have access to local and/or remote storage of user data for users of requestor user device 210 and/or provider user devices 220. In this case, the user data may include authentication data, user preferences, or the like. In some implementations, on-demand server 230 may be an application server, e.g., a server device associated with one or more applications that operate on requestor user device 210 and/or provider user devices 220 to facilitate peer-to-peer transactions between users of requestor user device 210 and provider user devices 220.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
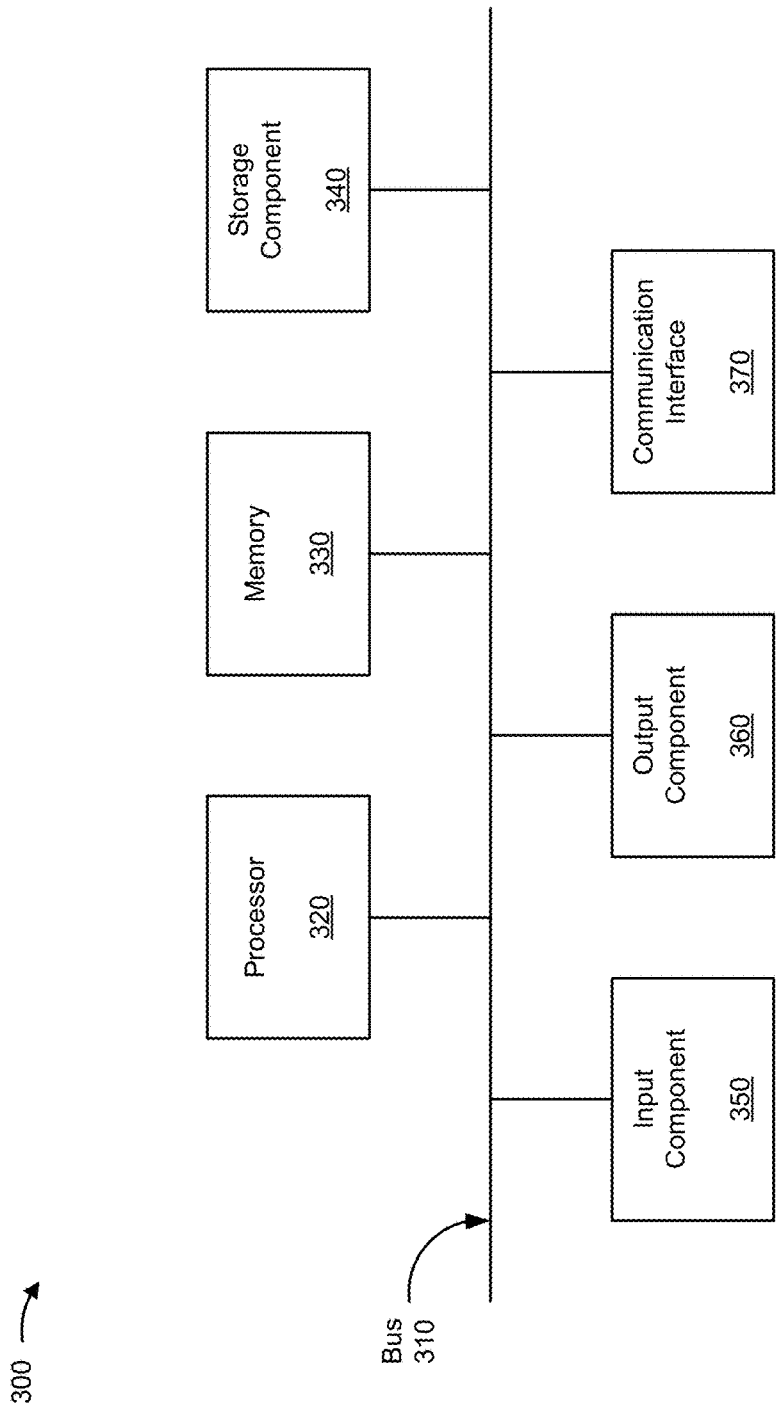
FIG. 3 is a diagram of example components of one or more devices of FIG. 2.

FIG. 3 is a diagram of example components of a device 300. Device 300 may correspond to requestor user device 210, provider user device 220, and/or on-demand server 230. In some implementations, requestor user device 210, provider user device 220, and/or on-demand server 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)). Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for performing location-based obfuscation of user information. In some implementations, one or more process blocks of FIG. 4 may be performed by on-demand server 230. In some implementations, one or more process blocks of FIG. 4 may be performed by another device or a group of devices separate from or including on-demand server 230, such as requestor user device 210 and/or provider user device 220.

As shown in FIG. 4, process 400 may include receiving, from a first device, a request for a product or service (block 410). For example, on-demand server 230 may receive, from requestor user device 210, a request that specifies a product or service. The request may be associated with an application operating on requestor user device 210, such as a peer-to-peer transaction application designed to enable a user of requestor user device 210 to obtain a product or service from a peer, e.g., a user of a provider user device 220. The request may be received via network 240, e.g., in one or more Internet protocol packets or the like.

In some implementations, the request can include a general request for providers of products and services. For example, rather than requesting a specific product or service, a user of requestor user device 210 may wish to determine which products and services are available from which providers. In some implementations, the request can be for a specific product and/or service. For example, a user of requestor user device 210 may be in need of paper currency and may not be near a bank or other entity capable of providing the user with paper currency. In this situation, the user may use requestor user device 210 to send a request for paper currency to on-demand server 230.

In some implementations, the request can include or be otherwise associated with location data indicating a location of the device that provided the request (i.e., requestor user device 210). For example, requestor user device 210 may include, in the request, GPS data indicating the location of requestor user device 210 at the time the request is made. The location data might be used by on-demand server 230 to determine a geographic location of requestor user device 210.

In some implementations, the request can include user account data associated with a user of the device that provides the request. For example, the request may include a user account identifier that identifies a user account for the user of requestor user device 210. The user account data might be used by on-demand server 230 to verify that the user of requestor user device 210 is a customer of an entity associated with on-demand server 230.

In this way, on-demand server 230 may receive a request for a product or service, enabling on-demand server 230 to determine a location for the first device and identify devices capable of providing the requested product or service requested.

As further shown in FIG. 4, process 400 may include determining a first geographic location of the first device (block 420). For example, on-demand server 230 may determine a first geographic location of requestor user device 210 based on the request. As noted above, in some implementations, the request can include or be otherwise associated with location data indicating a location of the device that provided the request (i.e., requestor user device 210). In some implementations, the location data can be based on user input, e.g., a user of requestor user device 210 can provide location data (e.g., associated with a location where the user would like to meet the provider of goods or services). In some implementations, on-demand server 230 may obtain the location data based on requesting requestor user device 210 to provide the location data. For example, based on receiving the request, on-demand server 230 may send a request, for the location data, to requestor user device 210. In some implementations, on-demand server 230 may receive the location data prior to, and/or independent of, the request. For example, on-demand server 230 may obtain the location data based on requestor user device 210 having previously provided the location data to on-demand server 230 (i.e., before requestor user device 210 provided the request) and on-demand server 230 may store the location data in association with requestor user device 210. In some implementations, on-demand server 230 may obtain the location data from a device separate from requestor user device 210, such as a device associated with a third party location service.

In this way, on-demand server 230 may determine a first geographic location for requestor user device 210, enabling on-demand server 230 to facilitate a peer-to-peer transaction associated with the request. By way of example, on-demand server 230 can facilitate a delivery of currency to a user that uses requestor user device 210 to request currency.

As further shown in FIG. 4, process 400 may include identifying a second device that is located in a geographic region associated with the first geographic location (block 430). For example, on-demand server 230 may use data identifying the first geographic location to identify provider user devices 220 that may be capable of providing the requested product or service to the first geographic location or within the geographic region.

On-demand server 230 may determine the geographic region in a variety of ways. For example, on-demand server 230 may have access to data identifying multiple predetermined geographic regions, and the geographic region may be determined by identifying the geographic region that includes the first geographic location of requestor user device 210. As another example, on-demand server 230 may identify the geographic region using a predetermined distance from the first geographic location, e.g., the geographic region may be any area within 20 kilometers of the first geographic location. In some implementations, the size of the geographic region may depend on population density of the geographic area in which the geographic region is located, e.g., the geographic region within a densely populated city may be smaller than the geographic region within a sparsely populated rural area.

In some implementations, on-demand server 230 may identify provider user device 220 based on provider device data provided by provider user device 220. For example, on-demand server 230 may periodically receive provider device data from provider user devices 220. The provider device data, sent by provider user device 220, may include a variety of information regarding provider user device 220, such as information identifying a location of provider user device 220 and/or the products and/or services that a user of provider user device 220 is capable of providing to other users. In some implementations, and based on the periodic receipt of provider device data, on-demand server 230 may be aware of multiple provider user devices 220 that are within the geographic region and capable of providing the product or service requested by the user of requestor user device 210. Based on the received provider device data, on-demand server 230 may identify provider user device 220 (or provider user devices 220) located in the geographic region associated with the first geographic location.

In some implementations, on-demand server 230 may broadcast a request (e.g., within the geographic region) that includes data identifying the first geographic location and/or the product and/or service identified in the request sent by the user of requestor user device 210. The broadcast may be sent, for example, in a manner designed for the broadcast to be received by one or more provider user devices 220 within the geographic region (e.g., on-demand server 230 may send the broadcast to provider user devices 220 using a peer-to-peer transaction application). In this situation, provider user device 220, within the geographic region of the request, may provide a response to on-demand server 230 indicating that the user of provider user device 220 is willing to provide the user of requestor user device 210 with the requested product or service. Based on the response provided by provider user device 220, on-demand server 230 may identify provider user device 220 located in the geographic region associated with the first geographic location.

In some implementations, on-demand server 230 may use user account data (e.g., for the user of requestor user device 210 and/or for the users of provider user devices 220) to identify provider user device 220. For example, user account data may specify preferences for the user of requestor user device 210 and/or preferences for the user of provider user device 220. The preferences for the user of requestor user device 210 may be used to filter users of provider user devices 220 that are eligible to handle a given request sent by the user of requestor user device 210. The preferences of the user of provider user device 220 may be used to filter requests that the user of provider user device 220 is willing to handle. In some implementations, on-demand server 230 may use preferences included in user account data to filter users and identify the user of provider user device 220 that is capable of providing the product and/or service requested by the user of requestor user device 210.

Potential filters included in user account preferences may include, for example, filters based on distance (e.g., a threshold distance form the first geographic location), social connection (e.g., a degree to which users are connected in a social network platform, professional network platform, platform of the entity associated with on-demand server 230, or the like), type of account a user has with the entity operating on-demand server 230, ratings associated with a user of requestor user device 210 and/or a user of provider user device 220 (e.g., ratings given by previous users rating their experience with other users), insurance policy associated with a user and/or the entity operating on-demand server 230, or the like. For example, a user of requestor user device 210 that requests currency may have a user account including preferences to filter potential users of provider user devices 220 based on a threshold distance from the user of requestor user device 210 and/or an average rating that the potential users of provider user devices 220 have associated with their user account (e.g., based on user reviews from previous transactions). As another example, a user of provider user device 220 may filter requests based on a background check having been performed on the user of the requestor user device 210 associated with the request and geographic delivery area restrictions indicating geographic areas, or regions, to which the user of provider user device 220 has agreed to deliver products and/or services. In some implementations, filters can be based on the product or service being requested. For example, a user (of requestor user device 210 and/or provider user device 220) may have different filters, or preferences, for deliveries of currency than the filters or preferences for deliveries of other products, or for provision of services. On-demand server 230 may use user account data, including filters such as those described above (and/or other filters), to identify provider user device 220.

In this way, on-demand server 230 may identify one or more provider user devices 220 capable of providing the product or service included in the request, enabling on-demand server 230 to provide requestor user device 210 with data identifying users of provider user devices 220 that are capable of providing the requested product or service.

As further shown in FIG. 4, process 400 may include providing, to the first device, information regarding a second geographic location of the second device (block 440). For example, on-demand server 230 may provide requestor user device 210 with data identifying users of provider user devices 220 that are capable of providing the product or service requested by the user of requestor user device 210. In some implementations, on-demand server 230 obfuscates at least a portion of the data provided to requestor user device 210, e.g., the data identifying the locations of provider user devices 220.

In some implementations, on-demand server 230 may determine for which provider user device(s) 220 data should be provided to requestor user device 210. For example, on-demand server 230 may select a particular provider user device 220 for the user of requestor user device 210 and provide requestor user device 210 with information regarding the geographic location of the particular provider user device 220. For example, on-demand server 230 may select the particular provider user device 220 based on user device data associated with the particular provider user device 220. By way of example, on-demand server 230 may select the particular provider user device 220 associated with: a geographic location that is closest to the first geographic location of requestor user device 210, a highest rating for deliveries associated with the requested product and/or service, a social connection that is closest to the user of requestor user device 210, or the like. In some implementations, on-demand server 230 may use machine learning techniques to determine which provider user device 220 should be selected. For example, on-demand server 230 may train a machine learning model to produce a score associated with a user of provider user device 220 based on user device data provided by provider user devices 220, ratings for users of provider user devices, and user device data provided by requestor user devices 210. In this example, on-demand server 230 may use the score provided as output from a machine learning model to select the particular provider user device 220 (e.g., the particular provider user device 220 for which on-demand server 230 sends requestor user device 210 information, including location information).

In some implementations, on-demand server 230 obfuscates location data that identifies the location of the provider user device 220. For example, rather than providing requestor user device 210 with precise location data (e.g., a street address, GPS coordinates, or the like) for provider user device 220, on-demand server 230 may use a variety of location obfuscation techniques to provide requestor user device 210 with relatively coarse location data (e.g., an ETA, neighborhood, mock geographic location near the actual location, or the like) for provider user device 220. By way of example, on-demand server 230 may use data identifying the first geographic location of requestor user device 210 and data identifying the geographic location of provider user device 220 to obtain navigation data from a navigation device. The navigation data may include, for example, turn-by-turn directions and/or an ETA indicating when provider user device 220 should arrive at the first geographic location of requestor user device 210. In this example, on-demand server 230 may provide requestor user device 210 with the ETA as opposed to an actual geographic location of provider user device 220. On-demand server 230 may use other location obfuscation techniques (e.g., in addition to or alternatively to providing an ETA). For example, on-demand server 230 may distort location data to produce intentionally inaccurate and/or less precise location information, e.g., time may be added to or subtracted from an ETA, a mock user device with a mock geographic location may be provided to the requestor user device 210 (instead of the actual geographic location of provider user device 220), geographic coordinates may be altered, or the like.

In some implementations, on-demand server 230 may obfuscate data other than location data. This other data may include a variety of types of data associated with provider user device 220 and/or the user of provider user device 220, including user name, photograph, account type or identifier, types of products or services previously requested, other types of products or services capable of being provided (e.g., products or services other than the requested product or service), social network connections, or the like. On-demand server 230 may obfuscate data in a manner designed to provide users (e.g., of requestor user device 210, provider user devices 220, and/or on-demand server 230) with control over the accuracy of and type of data that may be provided to other users.

In some implementations, on-demand server 230 may obfuscate data (e.g., including location-based data and/or other data) based on user account data and/or filters associated with the user of requestor user device 210, the user of provider user device 220, and/or on-demand server 230. For example, on-demand server 230 may use filters similar to those provided above (e.g., for use in filtering which users of which provider user devices 220 are capable of providing which products and/or services to which users of which requestor user devices 210) to determine the manner in which data is obfuscated. For example, the user of provider user device 220 may specify, in account settings for the user of provider user device 220, that providing data identifying an exact location of provider user device 220 is permitted in particular situations (e.g., for transactions involving particular products and/or services, for transactions involving a user of requestor user device 210 that is socially connected to the user of provider user device 220, or the like). Additionally, or alternatively, the user of provider user device 220 may specify, in account settings for the user of provider user device 220, a degree to which data identifying provider user device 220 and/or the user of provider user device 220 should be obfuscated. For example, the user of provider user device 220 may specify, in user account preferences, that providing an ETA is a preferred method of obfuscating location. Another user of another provider user device 220 may prefer using a mock device location (e.g., a mock location within a particular range of the actual provider user device 220 location) as a method of obfuscating location.

In this way, on-demand server 230 may provide requestor user device 210 with obfuscated data regarding provider user devices 220, e.g., in a manner designed to ensure privacy and safety for the users of provider user devices 220. Providing requestor user device 210 with data regarding the geographic location of provider user devices 220 (e.g., obfuscated or not) may enable selection of a particular user of the users of provider user devices 220 to provide the requested product or service. For example, on-demand server 230 may provide requestor user device 210 with data that causes a peer-to-peer application operating on requestor user device 210 to display potential users of provider user devices 220 that are available to provide the product or service requested by requestor user device 210.

As further shown in FIG. 4, process 400 may include receiving, from the first device, an instruction to provide the request to the second device (block 450). For example, on-demand server 230 may receive instructions from requestor user device 210, and the instructions may specify a particular user of provider user device 220 (e.g., the particular user that the user of requestor user device 210 has selected to provide the requested product or service). The user of requestor user device 210 may base the selection on the data identifying users of provider user devices 220 (e.g., the data provided by on-demand server 230, which identifies users of provider user devices 220 that are capable of providing the requested product and/or service). The instructions may be provided to on-demand server 230 via network 240, e.g., via a peer-to-peer application operating on requestor user device 210.

In this way, on-demand server 230 may receive instructions identifying a particular user of a particular provider user device 220 that the user of requestor user device 210 has selected to provide the requested product or service to the user of requestor user device 210.

In some implementations, steps 440 and/or 450 may be obviated, e.g., in a situation where on-demand server 230 selects a particular provider user device 230 to provide the user of requestor user device with the requested product and/or service.

As further shown in FIG. 4, process 400 may include providing the request to the second device (block 460). For example, on-demand server 230 may provide the request to the particular provider user device 220 selected by the user of requestor user device 210 (e.g., as specified in the instructions provided by requestor user device 210). In some implementations, the request may be the same request originally provided by requestor user device 210 (e.g., the request received at block 410). In some implementations, the request may be different and/or include information that was not included in the original request. For example, on-demand server 230 may provide the particular provider user device 220 with the request that includes data identifying the first geographic location (e.g., of requestor user device 210), the product and/or service requested, data identifying information about the user of requestor user device 210 (e.g., a picture or name of the user), or the like. On-demand server 230 may provide the request via network 240, e.g., using a peer-to-peer application operating on the particular provider user device 220.

As noted above, in some implementations, the request may include data identifying the first geographic location (e.g., the location of requestor user device 210). For example, the request may include the actual location of requestor user device 210, in a manner designed to enable the user of the particular provider user device 220 to navigate to the user of requestor user device 210 with the requested product or service. In some implementations, on-demand server 230 may obfuscate data regarding requestor user device 210, such as user information and/or location (e.g., in a manner similar to the data obfuscation methods described above with respect to obfuscating location data of provider user devices 220). Obfuscating data regarding requestor user device 210 may improve privacy and/or security for the user of requestor user device 210 while still enabling the user of the particular provider user device 220 to deliver the requested product and/or service.

In this way, on-demand server 230 may provide the particular provider user device 220 with the request, enabling the user of the particular provider user device 220 to determine whether to accept the request and initiate a peer-to-peer transaction for the requested product or service.

As further shown in FIG. 4, process 400 may include receiving an acceptance of the request from the second device (block 470). For example, on-demand server 230 may receive, from the particular provider user device 220, data indicating that the user of the particular provider user device 220 has accepted the request and will provide the user of requestor user device 210 with the requested product or service. On-demand server 230 may receive the acceptance via network 240, e.g., via a peer-to-peer application operating on the particular provider user device 220.

In this way, on-demand server 230 may receive acceptance of the request from the particular provider user device 220, enabling on-demand server 230 to perform a variety of actions, such as notifying requestor user device 210 regarding the acceptance, notifying a third party device regarding the transaction, logging various aspects of the transaction, or the like.

As further shown in FIG. 4, process 400 may include providing, to the second device, data indicating the first geographic location of the first device (block 480). For example, based on receiving the acceptance, on-demand server 230 may provide the particular provider user device 220 with data indicating the first geographic location of user device, e.g., in a manner designed to enable the user of the particular provider user device 220 to navigate to the user of requestor user device 210 and provide the requested product or service. In some implementations, on-demand server 230 may provide the particular provider user device 220 with navigation instructions (e.g., turn-by-turn instructions received from a navigation device, such as a navigation service server device). In some implementations, and as noted above, the first geographic location may have been included in the request that on-demand server 230 provided to the particular provider user device 220 (e.g., at block 460).

In this way, on-demand server 230 may provide the particular provider user device 220 with data indicating the first geographic location of requestor user device 210, enabling the user of the particular provider user device 220 to provide the user of requestor user device 210 with the requested product or service.

In some implementations, on-demand server 230 may continue to receive periodic updates from the particular provider user device 220. For example, the particular provider user device 220 may receive updated location data indicating an updated geographic location for the particular provider user device 220 (e.g., in the form of updated GPS information while the particular provider user device 220 is on the way to the first geographic location of the requestor user device 210). In this situation, on-demand server 230 may provide requestor user device 210 with the updated location data. On-demand server 230 may, in some implementations, obfuscate the updated location data, e.g., in the same manner, or a different manner, from the obfuscation techniques described above (e.g., with respect to block 440). By way of example, the particular provider user device 220 may provide updated location data to on-demand server 230 while on the way to the user of requestor user device 210, and on-demand server 230 may obfuscate the updated location data before providing it to the requestor user device 210, e.g., in the form of an updated ETA.

In some implementations, on-demand server 230 may send notification data regarding the transaction (e.g., information regarding the transaction between the user of requestor user device 210 and the user of provider user device 220). For example, notification data may be sent to requestor user device 210 (e.g., to confirm the transaction, request a rating for the user of provider user device 220, or the like). Notification data may be send to provider user device 220 (e.g., to confirm the transaction, request a rating for the user of requestor user device 210, or the like). As another example, on-demand server 230 may send notification data to a user account server that is capable of debiting and/or crediting user accounts, such as user bank accounts associated with the user of requestor user device 210 and/or the user of provider user device 220. Notification data may also be sent to a third party device, such as a machine learning device (e.g., in a manner designed to improve machine learning models used to select provider user devices 230), a loyalty rewards device (e.g., in a manner designed to reward the users involved in the transaction for using the peer-to-peer transaction application), or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
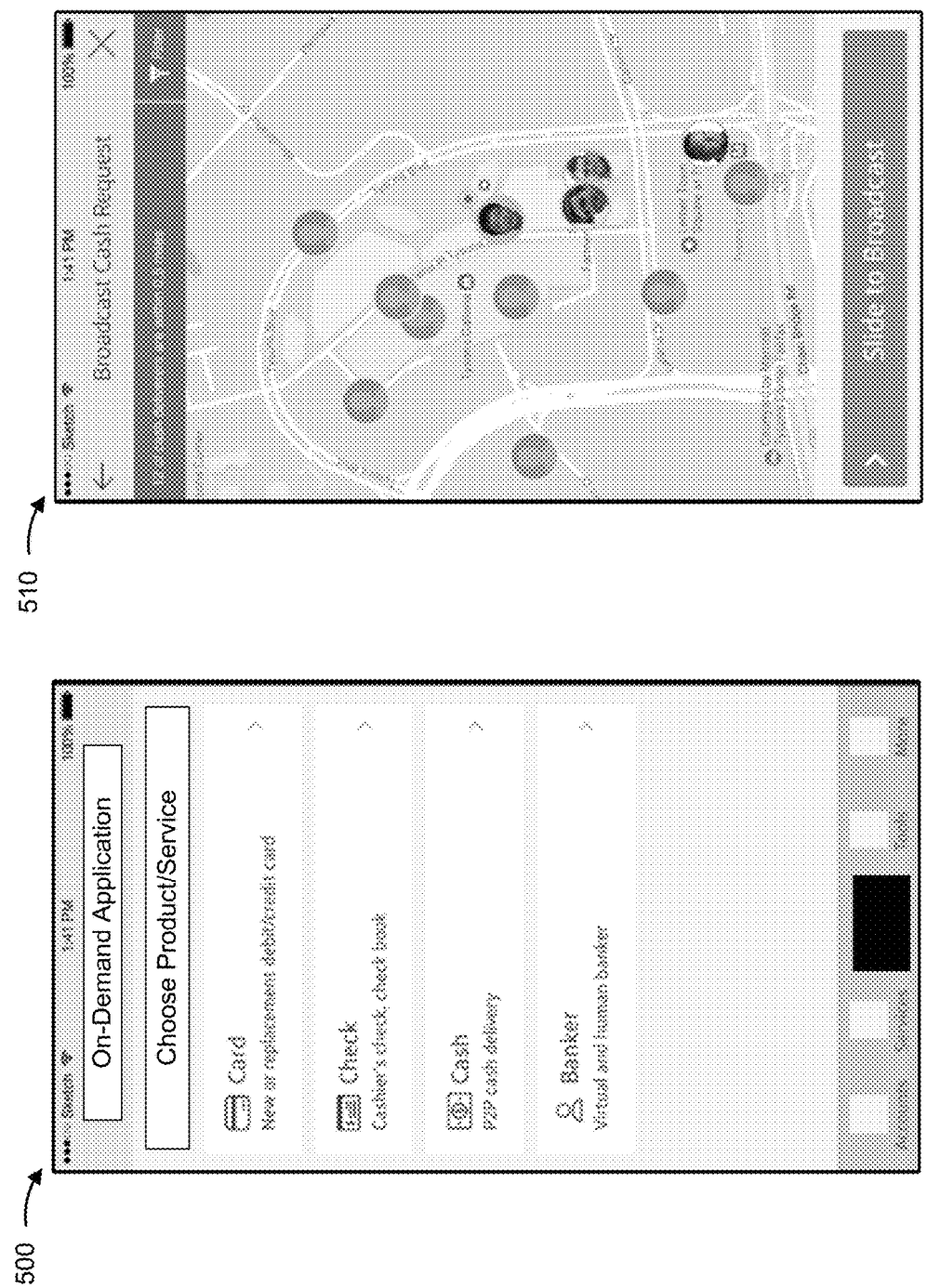
FIGS. 5A and 5B are diagrams depicting an example implementation of location-based obfuscation of user information.
Figure 5B:
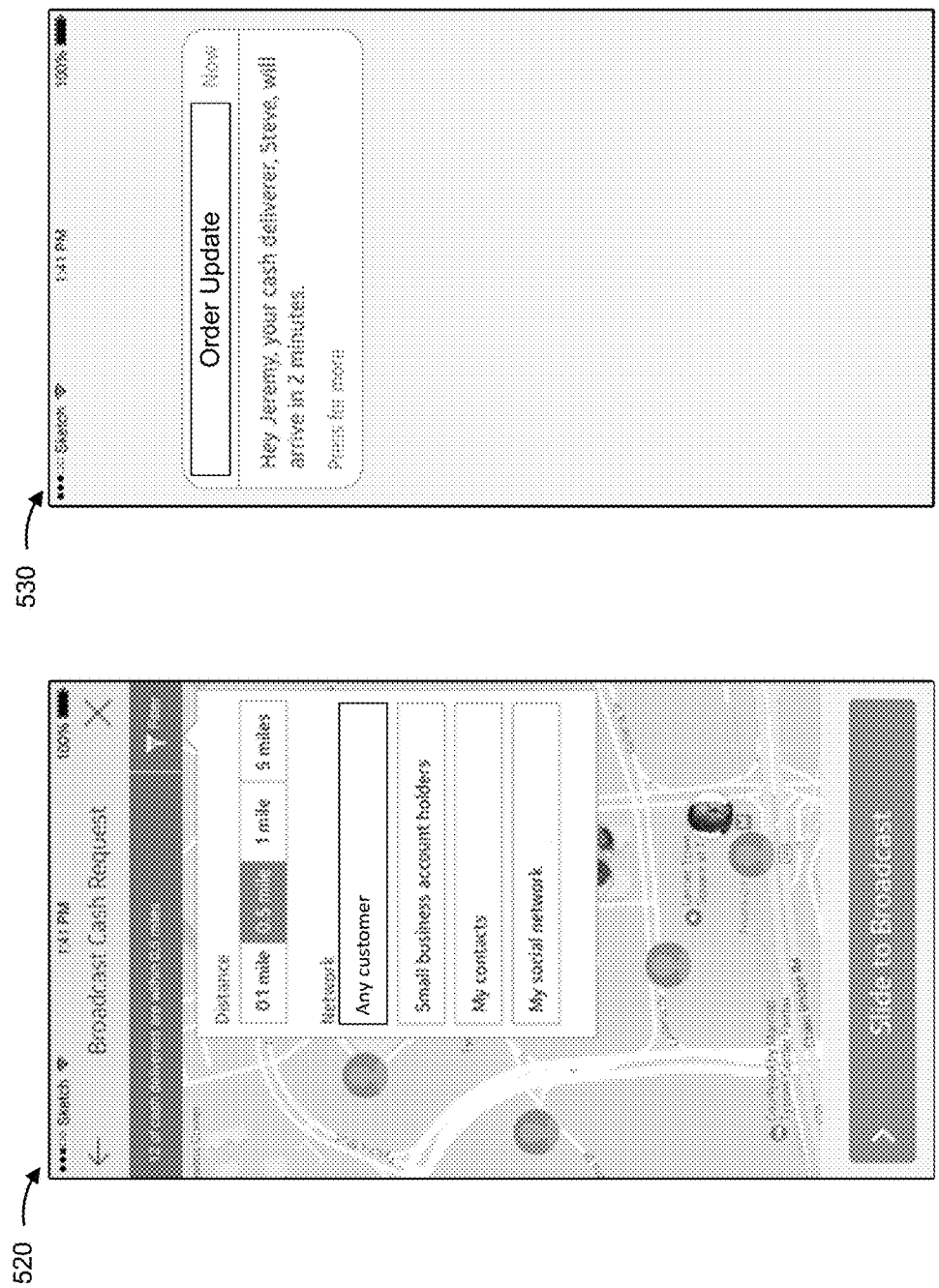

FIGS. 5A and 5B are diagrams depicting an example implementation of location-based obfuscation of user information. In particular, FIGS. 5A and 5B depict example user interfaces of a peer-to-peer transaction application that may operate on requestor user device 210, which may be used to communicate with on-demand server 230 to have products and/or services delivered to the user of requestor user device 210.

As shown in FIG. 5A, an example user interface 500 depicts a display of requestor user device 210 that enables a user of requestor user device 210 to select a product or service to be requested from provider user devices 220 via on-demand server 230. In the example interface 500, a user may select from options related to requesting a card, a check, cash products, or banker services. Assume that the user of requestor user device 210 selects the cash products option.

As further shown in FIG. 5A, an example user interface 510 depicts a display of requestor user device 210 that enables the user of requestor user device 210 to see locations of potential cash deliverers (e.g., users of provider user devices 220) on a map. The locations may have been provided, for example, by on-demand server 230 in response to the user's selection of a request for cash. The locations of the potential cash deliverers (e.g., provider user devices 220), and/or other data regarding the potential cash deliverers may be obfuscated, e.g., by intentionally providing imprecise locations or stock user photos on the map.

As shown in FIG. 5B, an example user interface 520 depicts a display of requestor user device 210 that enables the user of requestor user device 210 to select a particular provider user device 220 (e.g., a cash deliverer) to provide the requested product (e.g., cash) to the user of requestor user device 210. The example interface 520 depicts some example filters that may be applied by the user of requestor user device 210, such as distance and social network filters. As with the example interface 510, some of the information displayed in example interface 520 may have been obfuscated by on-demand server 230, such as the actual location of and/or photograph of the selected cash deliverer.

As further shown in FIG. 5B, an example user interface 530 depicts a display of requestor user device 210 that enables the user of requestor user device 210 to view obfuscated location data for the particular provider user device 220 (e.g., the device of the cash deliverer) that accepted the request for cash delivery. For example, the example interface 530 displays an ETA for the user of the selected provider user device 220 (e.g., the cash deliverer) arriving at the location provided by the user of requestor user device 210 (e.g., the first geographic location). The ETA is one example form of location obfuscation that may have been applied to the actual location of the particular provider user device 220 by on-demand server 230 prior to the location being provided to requestor user device 210.

As indicated above, FIGS. 5A and 5B are provided merely as examples. Other examples are possible and may differ from what was depicted and described with regard to FIGS. 5A and 5B.

As noted above, the ability to obfuscate location data, and potentially other information, of one or more users associated with a transaction may improve privacy and/or security for users participating in such transactions. Using a server device to facilitate transactions where individuals meet may also conserve resources (e.g., processing resources, data storage resources, network bandwidth resources, and/or time resources) for user devices that might otherwise have been responsible for using user device resources to identify potential providers of goods and services and to provide obfuscated and/or un-obfuscated location data. In some implementations, the server may use customizable privacy and/or location settings for users involved in a transaction, obviating the need for users to provide transaction details and preferences with every transaction, which may further conserve resources used by user devices during a transaction.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A server device, comprising:
one or more memories; and
one or more processors, communicatively coupled to the one or more memories, to:
receive, from a first device, a request for a product or service;
determine a first geographic location of the first device;
identify, based on the request, a plurality of second devices that are located in a geographic region associated with the first geographic location,
the plurality of second devices being associated with respective users that are capable of providing the product or service;
provide, to the first device, information regarding second geographic locations of the plurality of second devices,
the information specifying an obfuscated second geographic location of at least one of the plurality of second devices,
the obfuscated second geographic location being determined based on identifying a third geographic location that is within a threshold distance from an actual second geographic location of the at least one of the plurality of second devices;
receive, from the first device, an instruction to provide the request to a subset of the plurality of second devices;
provide, based on the instruction, the request to the subset of the plurality of second devices;
receive an acceptance of the request from a second device included in the subset of the plurality of second devices; and
provide, to the second device and based on receiving the acceptance, data indicating the first geographic location of the first device.

2. The server device of claim 1, where the one or more processors are further to:
provide, to the first device, data indicating that the second device is to provide the product or service.

3. The server device of claim 1, where the one or more processors are further to:
identify user account data associated with the first device, where the plurality of second devices are identified based on the user account data.

4. The server device of claim 1, where the information specifying the obfuscated second geographic location includes an estimated delivery time from the actual second geographic location to the first geographic location.

5. The server device of claim 1, where the one or more processors are further to:
receive an updated second geographic location for the second device; and
provide, to the first device, information specifying obfuscated location data based on the updated second geographic location.

6. The server device of claim 5, where the information specifying the obfuscated location data includes an estimated time of arrival of the second device at the first geographic location without revealing the updated second geographic location.

7. A non-transitory computer-readable medium storing instructions, the instructions comprising:
one or more instructions that, when executed by one or more processors, cause the one or more processors to:
receive, from a first device, a request for a product or service;
determine a first geographic location of the first device;
identify, based on the request, a second device that is located in a geographic region associated with the first geographic location,
the second device being associated with a user that is capable of providing the product or service;
provide, to the first device, information regarding a second geographic location of the second device,
the information specifying an obfuscated second geographic location of the second device without revealing the second geographic location of the second device,
the obfuscated second geographic location being determined based on identifying a third geographic location that is within a threshold distance from the second geographic location of the second device;
receive, from the first device, a first instruction to provide the request to the second device;
provide, based on the first instruction, the request to the second device;
receive an acceptance of the request from the second device; and
provide, to the second device, data indicating the first geographic location of the first device.

8. The non-transitory computer-readable medium of claim 7, where the threshold distance is based on a measure of population density for the geographic region.

9. The non-transitory computer-readable medium of claim 7, where the one or more instructions, that cause the one or more processors to provide the information regarding the second geographic location of the second device, cause the one or more processors to:
provide, for display by the first device, data representing the obfuscated second geographic location on a map.

10. The non-transitory computer-readable medium of claim 7, where the obfuscated second geographic location includes an estimated time of arrival of the first device at the second geographic location.

11. The non-transitory computer-readable medium of claim 10, where the one or more instructions, when executed by the one or more processors, further cause the one or more processors to:
provide a navigation device with data requesting navigation instructions for navigating from the second geographic location to the first geographic location; and
receive, from the navigation device, data indicating the estimated time of arrival.

12. A method, comprising:
receiving, by a server device and from a first device, a request for a product or service;
determining, by the server device, a first geographic location of the first device;
identifying, by the server device and based on the request, a second device that is located in a geographic region associated with the first geographic location,
the second device being associated with a user that is capable of providing the product or service;

providing, by the server device and to the first device, information regarding the second device;

receiving, by the server device and from the first device, an instruction to provide the request to the second device;

providing, by the server device and based on the instruction, the request to the second device;

receiving, by the server device, an acceptance of the request from the second device; and providing, by the server device and to the second device, data indicating the first geographic location of the first device; and providing, by the server device and to the first device, information specifying an obfuscated second geographic location of the second device, the obfuscated second geographic location being determined based on identifying a third geographic location that is within a threshold distance from an actual second geographic location of the second device.

13. The method of claim 12, where the information specifying the obfuscated second geographic location includes mock data representing a mock geographic location of the second device without revealing the actual second geographic location of the second device.

14. The method of claim 12, further comprising:
identifying user account data associated with the first device; and
generating information specifying the obfuscated second geographic location based on a type of account associated with the user account data.

15. The method of claim 12, further comprising:
identifying first user account data associated with the first device;
identifying second user account data associated with the second device;
identifying a social connection based on the first user account data and the second user account data; and
generating the information specifying the obfuscated second geographic location based on the social connection.

16. The method of claim 12, further comprising:
identifying user account data associated with the second device;
identifying, based on the user account data, obfuscation preferences; and
generating the information specifying the obfuscated second geographic location based on the obfuscation preferences.

17. The method of claim 12, further comprising:
identifying user account data associated with the second device; and
providing, to the first device, information specifying obfuscated account data based on the user account data.

18. The method of claim 12, further comprising:
generating the information specifying the obfuscated second geographic location based on the product or service.

19. The server device of claim 1, where the information specifying the obfuscated second geographic location includes mock data representing a mock geographic location of the at least one of the second devices without revealing the actual second geographic location of the at least one of the plurality of second devices.

20. The server device of claim 1, where the one or more processors are further to:
identify user account data associated with the first device; and
generate information specifying the obfuscated second geographic location based on a type of account associated with the user account data.

* * * * *